(12) United States Patent
Deshpande

(10) Patent No.: US 7,836,091 B2
(45) Date of Patent: Nov. 16, 2010

(54) SYSTEMS AND METHODS FOR PROVIDING ACCESS TO AN EMBEDDED THUMBNAIL IMAGE

(75) Inventor: Sachin G. Deshpande, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1719 days.

(21) Appl. No.: 10/744,220

(22) Filed: Dec. 19, 2003

(65) Prior Publication Data

US 2005/0138009 A1    Jun. 23, 2005

(51) Int. Cl.
*G06F 3/048* (2006.01)
*G06F 3/00* (2006.01)

(52) U.S. Cl. .................. 707/798; 707/799; 715/760

(58) Field of Classification Search .............. 707/3; 705/1, 26; 715/500.1, 767; 345/660; 358/1.15
See application file for complete search history.

(56) References Cited

U.S. PATENT DOCUMENTS

| | | | |
|---|---|---|---|
| 6,310,647 B1 | 10/2001 | Parulski et al. | |
| 6,700,589 B1 * | 3/2004 | Canelones et al. | 345/660 |
| 6,931,600 B1 * | 8/2005 | Pittman | 715/767 |
| 2001/0023438 A1 | 9/2001 | Ishida | |
| 2003/0093321 A1 * | 5/2003 | Bodmer et al. | 705/26 |
| 2003/0182139 A1 * | 9/2003 | Harris et al. | 705/1 |
| 2003/0237043 A1 * | 12/2003 | Novak et al. | 715/500.1 |
| 2004/0184072 A1 * | 9/2004 | Jacobsen et al. | 358/1.15 |

FOREIGN PATENT DOCUMENTS

| | | |
|---|---|---|
| GB | 2 356 474 | 5/2001 |
| JP | 1-0164483 | 6/1998 |
| JP | 1-0271370 | 10/1998 |
| JP | 1-1136631 | 5/1999 |
| JP | 2002-261756 | 9/2002 |
| WO | WO 94/22108 | 9/1994 |
| WO | WO 02/41629 | 5/2002 |

OTHER PUBLICATIONS

Exchangeable image file format (EXIF) for Digital Still Cameras, http://www.ba.wakwak.com/~tsuruzoh/Computer/Digicams/exif-e.html, Pages=26.

(Continued)

*Primary Examiner*—Etienne P LeRoux
*Assistant Examiner*—Susan Y Chen
(74) *Attorney, Agent, or Firm*—Austin Rapp & Hardman

(57) ABSTRACT

Systems and methods are disclosed for providing access to a thumbnail image that is embedded within an image file along with a corresponding main image. An exemplary method involves receiving a request from a client for the thumbnail image. The thumbnail image is retrieved from an image host. The entire image file is not retrieved from the image host. The thumbnail image may be sent to the client. Alternatively, the thumbnail location information may be sent to the client. Retrieving the thumbnail image from the image host may involve identifying a location of the thumbnail image within the image file, and retrieving data from the image file corresponding to the location.

34 Claims, 8 Drawing Sheets

OTHER PUBLICATIONS

JEIDA, "Design Rule for Camera File System Version 1.0", Pages=46.

PHP manual EXIF function, http://www.php.net/manual/en/function.exif/thumbnail.php, Pages=3.

Fielding R., Gettys J., Mogul J.C., Frystyk H., Masinter L., Leach P., Berners-Lee T., "Hyper-text Transfer Protocol—HTTP 1.1," RFC 2616, Jun. 1999, http://www.ietf.org/rfc/rfc2616.txt, Pages=70.

* cited by examiner

SYSTEMS AND METHODS FOR PROVIDING ACCESS TO AN EMBEDDED THUMBNAIL IMAGE

TECHNICAL FIELD

The present invention relates generally to digital images. More specifically, the present invention relates to systems and methods for retrieving a thumbnail image that is embedded within the same image file as the corresponding main image.

BACKGROUND

An information system typically includes at least one computer system (a server) that makes information available so that other computer systems (clients) can access the information. The server typically manages access to the information. The server and clients communicate via messages conforming to a communication protocol and sent over a communication channel such as a computer network.

Information sources managed by the server may include files, databases, and applications on the server system or on an external computer system. The information that the server provides may be stored on the server, converted from other formats manually or automatically, calculated on the server in response to a client request, derived from data and applications on the server or other machines, or derived by any combination of these and/or other suitable techniques.

One type of information source that is often managed by a server is a digital image file. A digital image file is a picture that has been created or copied and stored in electronic form. A digital image file may be created by taking a picture with a digital camera, scanning a hard copy of a picture, etc.

Often, there are at least two types of digital images associated with the same picture, the "main" image and a corresponding "thumbnail" image. The thumbnail image is a smaller representation of the main image. Thumbnail images are usually intended to make it easier and faster to look at or manage a group of larger images. For example, software that allows a user to manage a number of images often provides a thumbnail version of each image so that the user does not have to remember the file name of each image.

Often, a client may request a thumbnail image from a server. This may be the case, for example, when a web server is transmitting a web page to a client browser. Many web pages display thumbnail images instead of full size images because the thumbnail images download more quickly and still communicate the intended expression to the user.

Sometimes, both the main image and the corresponding thumbnail image are included in the same image file. In other words, the thumbnail image may be embedded in the image file along with the main image. Accordingly, benefits may be realized by improved systems and methods for retrieving a thumbnail image that is embedded in an image file along with the corresponding main image.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

Figure 1:
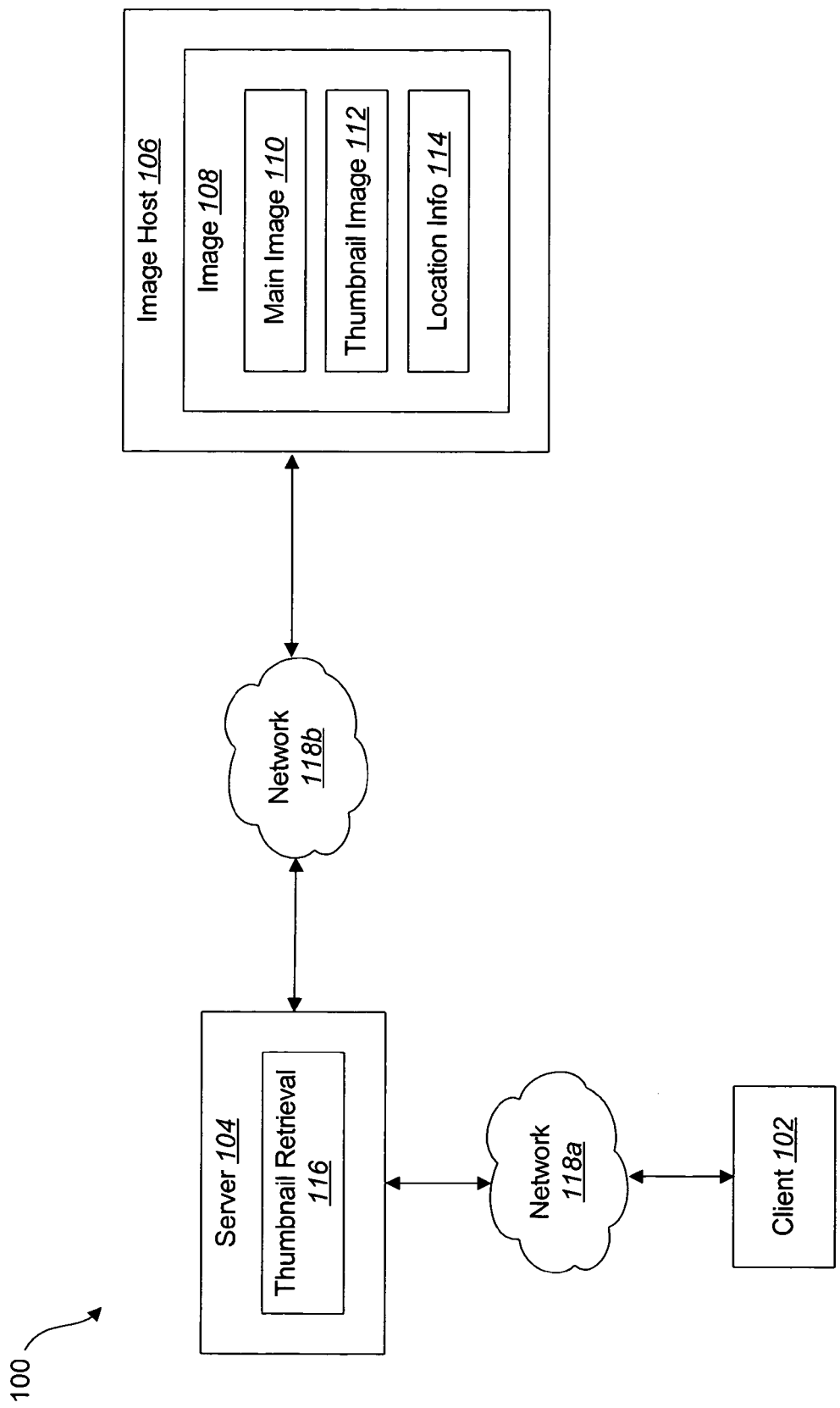
FIG. 1 is a block diagram illustrating an exemplary system in which some embodiments may be practiced.

A method in a server for fulfilling a request from a client for a thumbnail image is disclosed. A request for a thumbnail image is received from a client. The thumbnail image is embedded in an image file along with a corresponding main image. The thumbnail image is retrieved from an image host. The entire image file is not retrieved from the image host. The thumbnail image is sent to the client.

In some embodiments, retrieving the thumbnail image may involve identifying a location of the thumbnail image within the image file, and retrieving data from the image file corresponding to the location. Identifying the location of the thumbnail image may involve retrieving a first portion of the image file from the image host, and then determining whether the first portion of the image file comprises thumbnail location information. Identifying the location of the thumbnail image may additionally involve retrieving a second portion of the image file from the image host if the first portion does not comprise the thumbnail location information. It may then be determined whether the second portion of the image file includes the thumbnail location information. The thumbnail location information may include an offset to the thumbnail image in the image file, and a size of the thumbnail image.

In some embodiments, the image file is in the exchangeable image file format (EXIF). The request may be received from the client and the thumbnail image may be sent to the client in accordance with hypertext transfer protocol (HTTP). In addition, the thumbnail image may be retrieved from the image host in accordance with hypertext transfer protocol (HTTP).

Retrieving the thumbnail image from the image host may involve retrieving the bytes corresponding to the thumbnail image. The thumbnail image may be retrieved from the image host in accordance with hypertext transfer protocol (HTTP). Retrieving the bytes corresponding to the thumbnail image may be accomplished using the byte-range feature of HTTP.

A server that is configured to fulfill a request from a client for a thumbnail image is also disclosed. The server includes a thumbnail retrieval component that is configured to implement a method that involves receiving a request for a thumbnail image. The thumbnail image is embedded in an image file along with a corresponding main image. The thumbnail image is retrieved from an image host. The entire image file is not retrieved from the image host. The thumbnail image is sent to the client.

In some embodiments, retrieving the thumbnail image may involve identifying a location of the thumbnail image within the image file, and retrieving data from the image file corresponding to the location. Identifying the location of the thumbnail image may involve retrieving a first portion of the image file from the image host, and determining whether the first portion of the image file includes thumbnail location information. The thumbnail retrieval component may be selected from the group consisting of an Active Server Page, a Java Server Page, and a Common Gateway Interface script.

A set of executable instructions for implementing a method in a server is also disclosed. The method involves receiving a request for a thumbnail image. The thumbnail image is embedded in an image file along with a corresponding main image. The thumbnail image is retrieved from an image host. The entire image file is not retrieved from the image host. The thumbnail image is sent to the client.

Retrieving the thumbnail image may involve identifying a location of the thumbnail image within the image file, and retrieving data from the image file corresponding to the location. Identifying the location of the thumbnail image may involve retrieving a portion of the image file from the image host, and determining whether the portion of the image file includes thumbnail location information.

A method in a server for providing access to an embedded thumbnail image is also disclosed. A request is received from a client for a location of a thumbnail image. The thumbnail image is embedded in an image file along with a corresponding main image. Thumbnail location information is retrieved from an image host. The entire image file is not retrieved from the image host. The thumbnail location information is sent to the client.

Retrieving the thumbnail location information may involve retrieving a first portion of the image file from the image host, and determining whether the first portion of the image file includes the thumbnail location information. Retrieving the thumbnail location information may additionally involve retrieving a second portion of the image file from the image host if the first portion does not comprise the thumbnail location information. It may then be determined whether the second portion of the image file includes the thumbnail location information. The thumbnail location information may include an offset to the thumbnail image in the image file, and a size of the thumbnail image.

The image file may be in the exchangeable image file format (EXIF). The request may be received from the client and the thumbnail location information may be sent to the client in accordance with hypertext transfer protocol (HTTP). The thumbnail location information may be retrieved from the image host in accordance with hypertext transfer protocol (HTTP).

A method in a client for accessing an embedded thumbnail image is also disclosed. A request is sent to a server for a location of a thumbnail image. The thumbnail image is embedded in an image file along with a corresponding main image. Thumbnail location information is received from the server. The thumbnail location information is used to retrieve the thumbnail image from an image host. The entire image file is not retrieved from the image host.

The thumbnail location information may include an offset to the thumbnail image in the image file, and a size of the thumbnail image. The image file may be in the exchangeable image file format (EXIF). The request may be sent to the server and the thumbnail location information may be received from the server in accordance with hypertext transfer protocol (HTTP). In some embodiments, retrieving the thumbnail image from the image host may involve retrieving the bytes corresponding to the thumbnail image. The thumbnail image may be retrieved from the image host in accordance with hypertext transfer protocol (HTTP), and retrieving the bytes corresponding to the thumbnail image may involve using the byte-range feature of HTTP.

A method for providing access to an embedded thumbnail image is also disclosed. The method involves publishing a reference to a thumbnail image that is embedded in an image file along with a corresponding main image. A request is received from a client for the thumbnail image. The request includes the reference to the thumbnail image. The thumbnail image is retrieved from an image host. The entire image file is not retrieved from the image host. The thumbnail image is sent to the client.

A method in a server for providing access to an embedded thumbnail image is also disclosed. The method involves publishing a reference to a thumbnail image that is embedded in an image file along with a corresponding main image. A request is received from a client for a location of a thumbnail image. The request includes the reference to the thumbnail image. Thumbnail location information is retrieved from an image host. The entire image file is not retrieved from the image host. The thumbnail location information is sent to the client.

Various embodiments of the invention are now described with reference to the Figures, where like reference numbers indicate identical or functionally similar elements. It will be readily understood that the components of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Those skilled in the art will appreciate that many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, those skilled in the art will recognize that such software may include any type of computer instruction or computer executable code located within a memory device. Software that implements the functionality associated with components described herein may comprise a single instruction, or many instructions, and may be distributed over several different code segments, among different programs, and across several memory devices.

FIG. 1 is a block diagram illustrating an exemplary system 100 in which some embodiments may be practiced. As shown, embodiments disclosed herein may involve interaction between a client 102, a server 104, and an image host 106.

In some embodiments, the client 102 may be a web browser, and the server 104 may be a web server.

An image file 108 is stored on the image host 106. The image file 108 includes a main image 110. In addition to the main image 110, a thumbnail image 112 is embedded within the image file 108. The thumbnail image 112 is a smaller representation of the main image 110. The image file 108 also includes thumbnail location information 114. The location information 114 specifies the location of the thumbnail image 112 within the image file 108. For example, the location information 114 may include the offset to the beginning of the thumbnail image 112 as well as the size of the thumbnail image 112.

In some embodiments, the image file 108 is in the exchangeable image file (EXIF) format. Image files 108 in the EXIF format typically include an image file directory (IFD). The location information 114 may be found in the IFD, and more specifically, within the JpegIFOffset tag (sometimes referred to as the JPEGInterchangeFormat tag) and the JpegIFByteCount tag (sometimes referred to as the JPEGInterchangeFormatLength tag) within the IFD. The JpegIFOffset tag indicates the offset to the thumbnail image 112, and the JpegIFByteCount tag indicates the size of the thumbnail image 112.

The server 104 includes a thumbnail retrieval component 116. The thumbnail retrieval component 116 retrieves the thumbnail image 112 from the image host 106. Advantageously, in embodiments disclosed herein, it is not necessary to retrieve the entire image file 108 in order to retrieve the thumbnail image 112. In some embodiments, the thumbnail retrieval component 116 takes the form of program instructions that are stored in memory and executed by a processor. The program instructions may be embodied as an Active Server Page (ASP), a Java Server Page (JSP), a Common Gateway Interface (CGI) script, etc. Additional details about various embodiments of the thumbnail retrieval component 116 will be provided below.

The client 102 and the server 104 may be in electronic communication with each other over one or more computer networks 118a. Thus, data transmitted from the client 102 to the server 104, and vice versa, may pass through one or more intermediate nodes en route to its destination. Similarly, the server 104 and the image host 106 may be in electronic communication with each other over one or more computer networks 118b. Thus, data transmitted from the server 104 to the image host 106, and vice versa, may pass through one or more intermediate nodes en route to its destination. The networks 118a, 118b may be the same network 118. Embodiments may be used in local area networks (LANs), storage area networks (SANs), metropolitan area networks (MANs), wide area networks (WANs), and combinations thereof (e.g., the Internet) with no requirement that the client 102 and the server 104 or the server 104 and the image host 106 reside in the same physical location, the same network 118 segment, or even in the same network 118. A variety of different network configurations and protocols may be used, including Ethernet, TCP/IP, UDP/IP, IEEE 802.11, IEEE 802.16, Bluetooth, asynchronous transfer mode (ATM), fiber distributed data interface (FDDI), token ring, and so forth, including combinations thereof. Of course, some embodiments may also be practiced with conventional point-to-point connections, such as enterprise systems connection (ESCON), small computer system interface (SCSI), fiber channel, etc., that may not typically be viewed as a "network."

Figure 2:
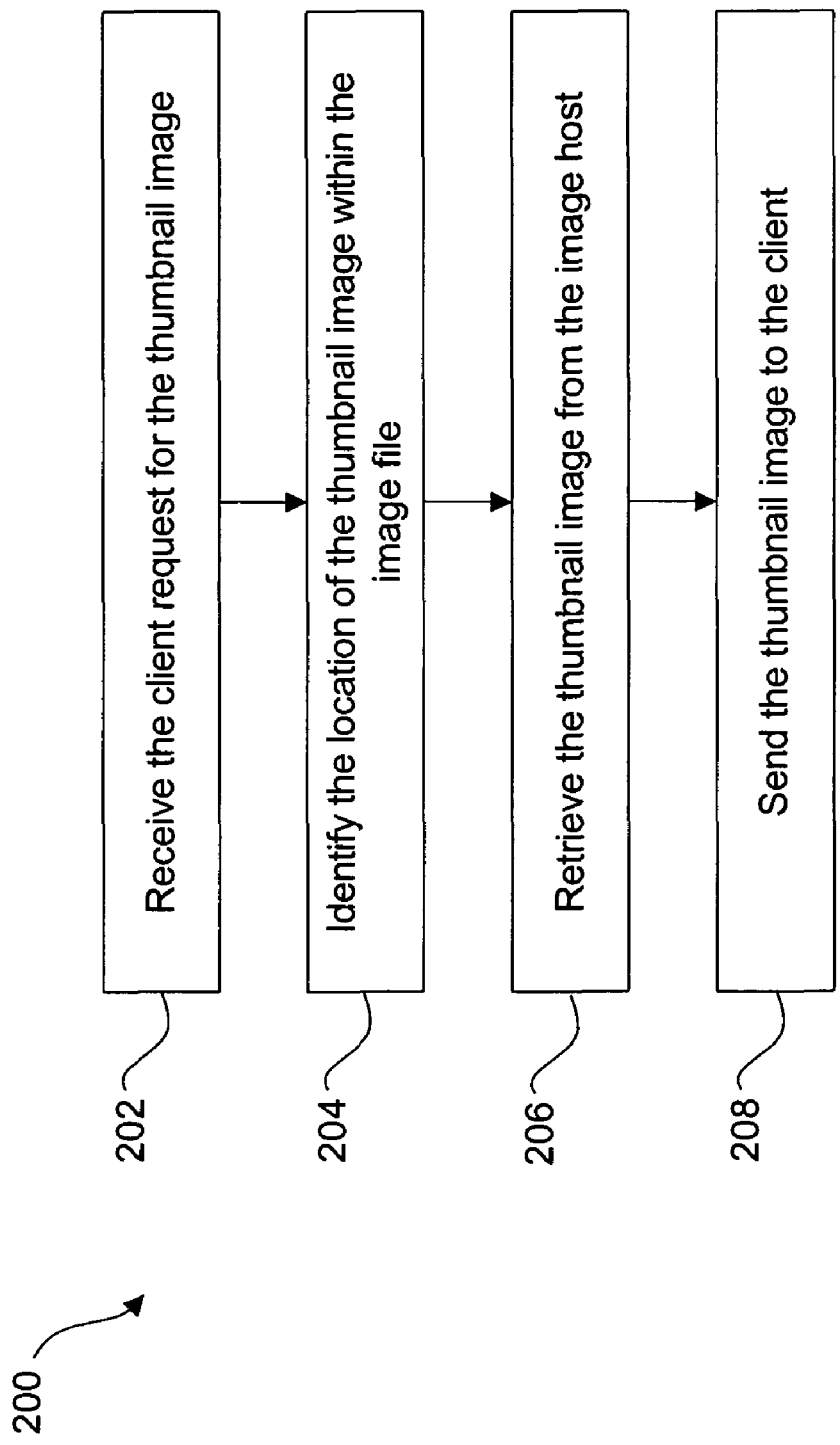
FIG. 2 is flow diagram illustrating an exemplary method that may be performed by the thumbnail retrieval component in the system shown in FIG. 1.

FIG. 2 is flow diagram illustrating an exemplary method 200 that may be performed by the thumbnail retrieval component 116 in the system 100 shown in FIG. 1. The order of the steps or actions of the method 200 is for illustrative purposes only and may be changed in alternative embodiments.

The method 200 begins when a client request for the thumbnail image 112 is received 202. In some embodiments, the server 104 may publish a reference (e.g., a URL) to the image file 108. In such embodiments, the client request may include the reference to the image file 108, as well as some type of indication that the thumbnail image 112 is to be retrieved (as opposed to the main image 110). Alternatively, the server 104 may publish a direct reference to the thumbnail image 112, and the client request may include the direct reference to the thumbnail image 112.

The location of the thumbnail image 112 within the image file 108 is then identified 204. This step is typically accomplished by retrieving the location information 114 within the image file 108. As discussed above, the location information 114 may include the offset to the beginning of the thumbnail image 112 and the size of the thumbnail image 112. An exemplary method for retrieving the location information 114 will be described in greater detail below in connection with FIG. 3.

Once the location of the thumbnail image 112 has been identified 204, the thumbnail image 112 is then retrieved 206 from the image host 106. In other words, image file data corresponding to the location identified in step 204 is retrieved. In some embodiments, this may be done in accordance with the HTTP protocol using a byte-range request. The thumbnail image data to be retrieved may be specified by a range header in the byte-range request. After the thumbnail image 112 has been retrieved from the image host 106, it is then sent 208 to the client 102.

Figure 3:
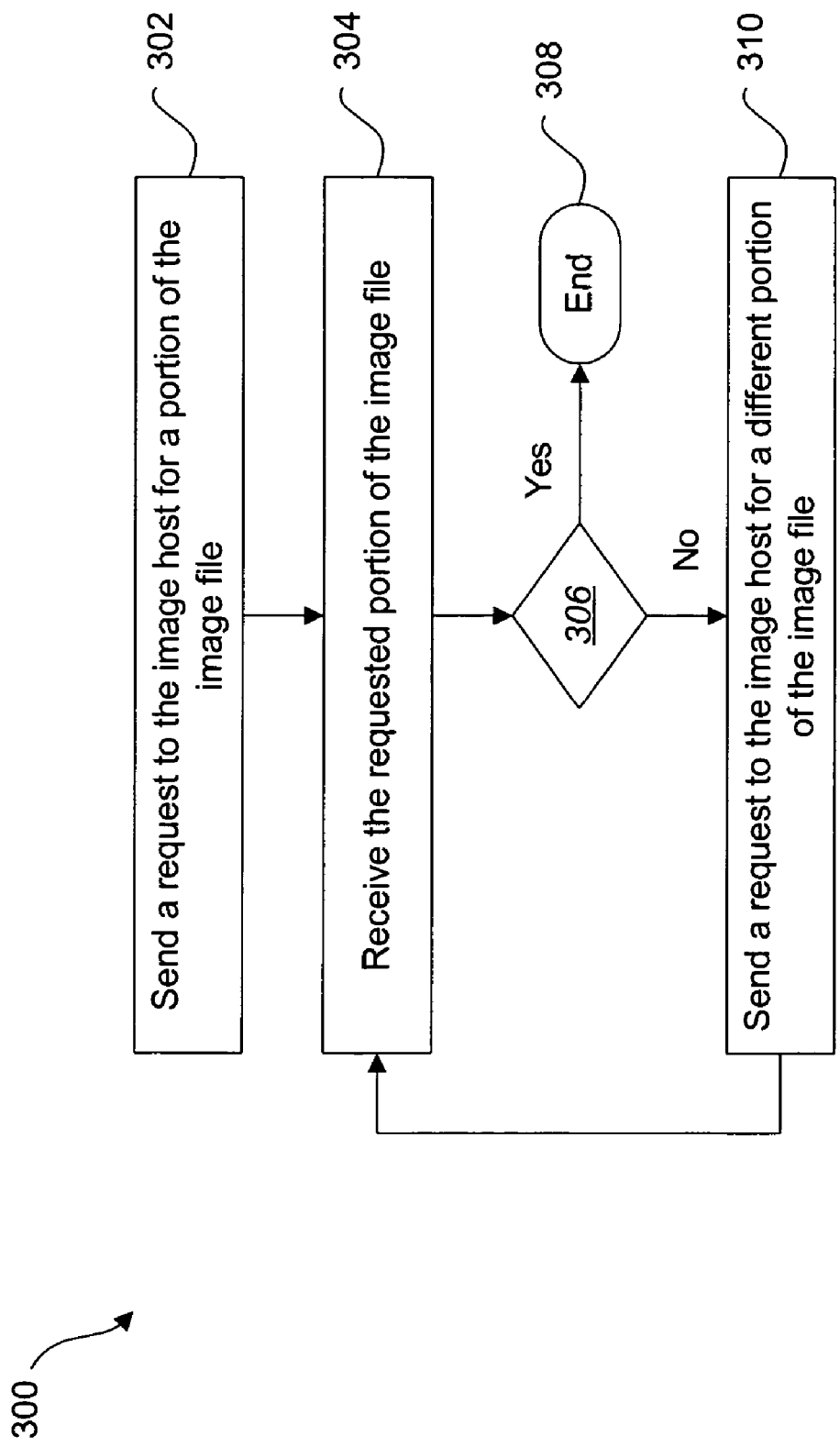
FIG. 3 is flow diagram illustrating an exemplary method for retrieving the location information within the image file.

FIG. 3 is flow diagram illustrating an exemplary method 300 for retrieving the location information 114 within the image file 108. In other words, FIG. 3 illustrates one exemplary way that step 204 of the method 200 shown in FIG. 2 may be implemented. The order of the steps or actions of the method 300 is for illustrative purposes only and may be changed in alternative embodiments.

The method 300 begins when a request is sent 302 to the image host 106 for a portion of the image file 108. For example, in some embodiments, a request is sent for the first N bytes of the image file 108. The value of N may be specified in a user-configurable preferences file. A default value of N may be specified by the designer.

Once the requested portion of the image file 108 has been received 304 from the image host 106, it is then determined 306 whether the location information 114 is included within the received portion of the image file 108. If the portion of the image file 108 received in step 304 does include the location information 114, the method 300 ends 308.

If the received portion of the image file 108 does not include the location information 114, the server 104 sends 310 a request to the image host 106 for a different portion of the image file 108. For example, in some embodiments, a request is sent for the next N bytes of the image file 108. The method 300 then returns to step 304 and proceeds as described above.

In other words, the method 300 involves continually retrieving different portions of the image file 108 until the location information 114 is obtained. The different portions of the image file 108 may be retrieved sequentially. For example, the first N bytes of the image file 108 may be retrieved initially. If this portion of the image file 108 does not include the location information 114, the next N bytes of the image file 108 (i.e., bytes N+1 to 2N) may be retrieved. If this portion of the image file 108 does not include the location information 114, the next N bytes of the image file 108 (i.e., bytes 2N+1 to 3N) may be retrieved, and so on, until the location information 114 is obtained.

As stated above, the method 300 shown in FIG. 3 illustrates one way that step 204 of the method 200 shown in FIG. 2 may be implemented. Typically, once the location information 114 for the thumbnail image 112 has been identified, the thumbnail image 112 is then retrieved from the image host 106, as discussed above.

Figure 4:
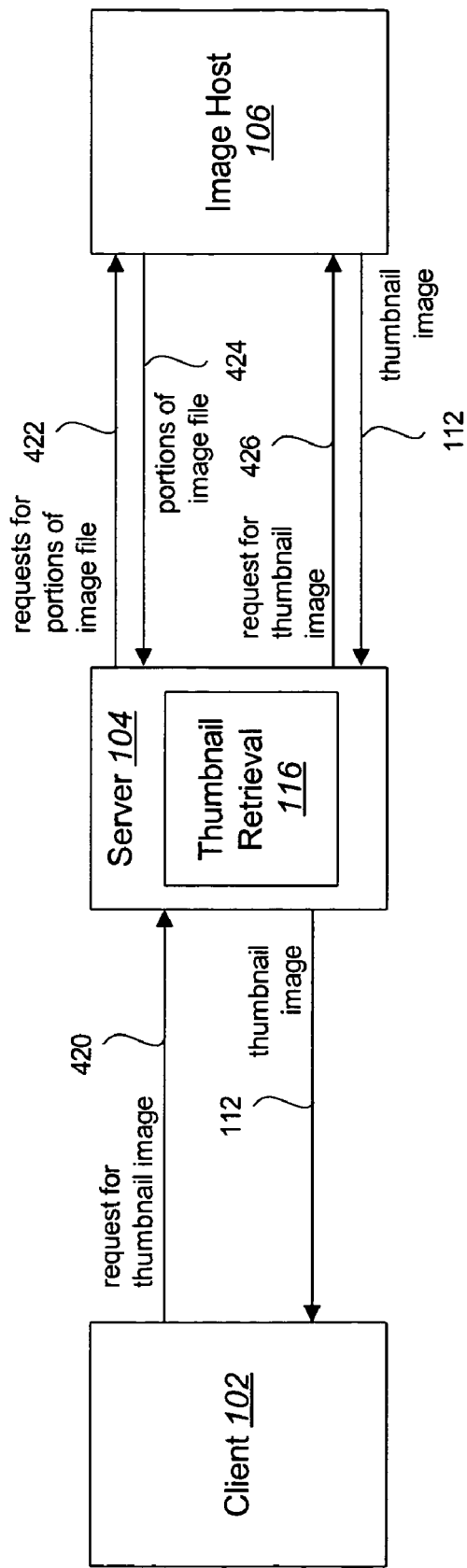
FIG. 4 is a signal flow diagram for the different components in the system of FIG. 1 while the methods of FIGS. 2-3 are being performed.

FIG. 4 is a signal flow diagram for the different components in the system 100 of FIG. 1 while the methods 200, 300 of FIGS. 2-3 are being performed. As shown, the client 102 sends a request 420 for the thumbnail image 112 to the server 104. In response, the thumbnail retrieval component 116 retrieves the thumbnail image 112 from the image host 106 and sends the thumbnail image 112 to the client 102.

Retrieving the thumbnail image 112 from the image host 106 typically involves sending one or more requests 422 to the image host 106 for different portions of the image file 108. As was discussed above, this may be done for the purpose of obtaining the location information 116 in the image file 108, so that the location of the thumbnail image 112 within the image file 108 may be identified. In response to the requests 422, the image host 106 sends the requested portions 424 of the image file 108 to the thumbnail retrieval component 116.

Once the location of the thumbnail image 112 within the image file 108 is identified, the thumbnail retrieval component 116 sends a request 426 to the image host 106 for the thumbnail image 112. In response to the request 426, the image host 106 sends the thumbnail image 112 to the thumbnail retrieval component 116.

Communication between the various components in FIG. 4 may occur in accordance with the hypertext transfer protocol (HTTP), including HTTP version 1.1. Some examples of HTTP messages that may be exchanged between the various components will now be provided.

The following is an example of a request 420 that may be sent from the client 102 to the server 104. In this example, the server 104 is using an Active Server Pages (ASP) technology.

```
GET http://www.host.com/aspway/xm9.asp?imgName=http://aspway.
tripod.com/ol.jpg
&imgSt=thumbnail HTTP/1.1
Host: www.host1.com
\r\n
```

An example of a request 422 that may be sent from the thumbnail retrieval component 116 to the image host 106 is now provided. The request 422 is for a portion of an image file 108. More specifically, this request 422 may be sent in order to obtain the first N bytes of the image file 108 (N=2047 in this example).

```
GET /ol.jpg HTTP/1.1
Host: www.imageshost.com
Range: bytes=1–2047
\r\n
```

An example of a response message that may be sent from the image host 106 to the thumbnail retrieval component 116 is now provided. The message includes the portion 424 of the image file 108 that was requested in the previous example.

```
HTTP/1.1 206 Partial Content
Date: Thu, 27 Mar 2003 02:20:04 GMT
Server: Apache/1.3.12 (Win32)
Last-Modified: Wed, 26 Mar 2003 19:04:01 GMT
ETag: "0-fffb-396386a1"
Accept-Ranges: bytes
Content-Length: 2048
Content-Range: bytes 1–2047/87599
Content-Type: image/jpeg
\r\n
[image data bytes 1–2047]
```

As discussed previously, in some embodiments, when the first N bytes of the image file are received, the thumbnail retrieval component 116 determines whether the location information 114 is included therein. If the location information 114 is not included, the thumbnail retrieval component 116 sends another request 422 to the image host 106 for the next N bytes (bytes 2048-4095 in this example).

The next example corresponds to a request 426 that may be sent from the thumbnail retrieval component 116 to the image host 106 in order to obtain a thumbnail image 112. The request typically includes the location of the thumbnail image 112 within the image file 108. In this example, the thumbnail image 112 is located at bytes 2024-7168 within the image file 108.

```
GET /ol.jpg HTTP/1.1
Host: www.imageshost.com
Range: bytes=2024–7168
\r\n
```

The next example corresponds to a response message that may be sent from the image host 106 to the thumbnail retrieval component 116 in response to the request 426. The message includes the thumbnail image 112. As in the previous example, the thumbnail image 112 is located at bytes 2024-7168 within the image file 108.

```
HTTP/1.1 206 Partial Content
Date: Thu, 27 Mar 2003 02:24:24 GMT
Server: Apache/1.3.12 (Win32)
Last-Modified: Wed, 26 Mar 2003 19:04:01 GMT
ETag: "0-fffb-396386a1"
Accept-Ranges: bytes
Content-Length: 5145
Content-Range: bytes 2024–7168/87599
Content-Type: image/jpeg
\r\n
[image data bytes 2024–7168]
```

The next example corresponds to a response message that may be sent from the server 104 to the client 102. The message includes the thumbnail image 112.

```
HTTP/1.1 200 OK
Date: Thu, 27 Mar 2003 02:24:24 GMT
Server: Apache/1.3.12 (Win32)
Last-Modified: Wed, 26 Mar 2003 02:25:01 GMT
Accept-Ranges: bytes
Content-Length: 5145
Content-Type: image/jpeg
\r\n
[5145 image data bytes]
```

Figure 5:
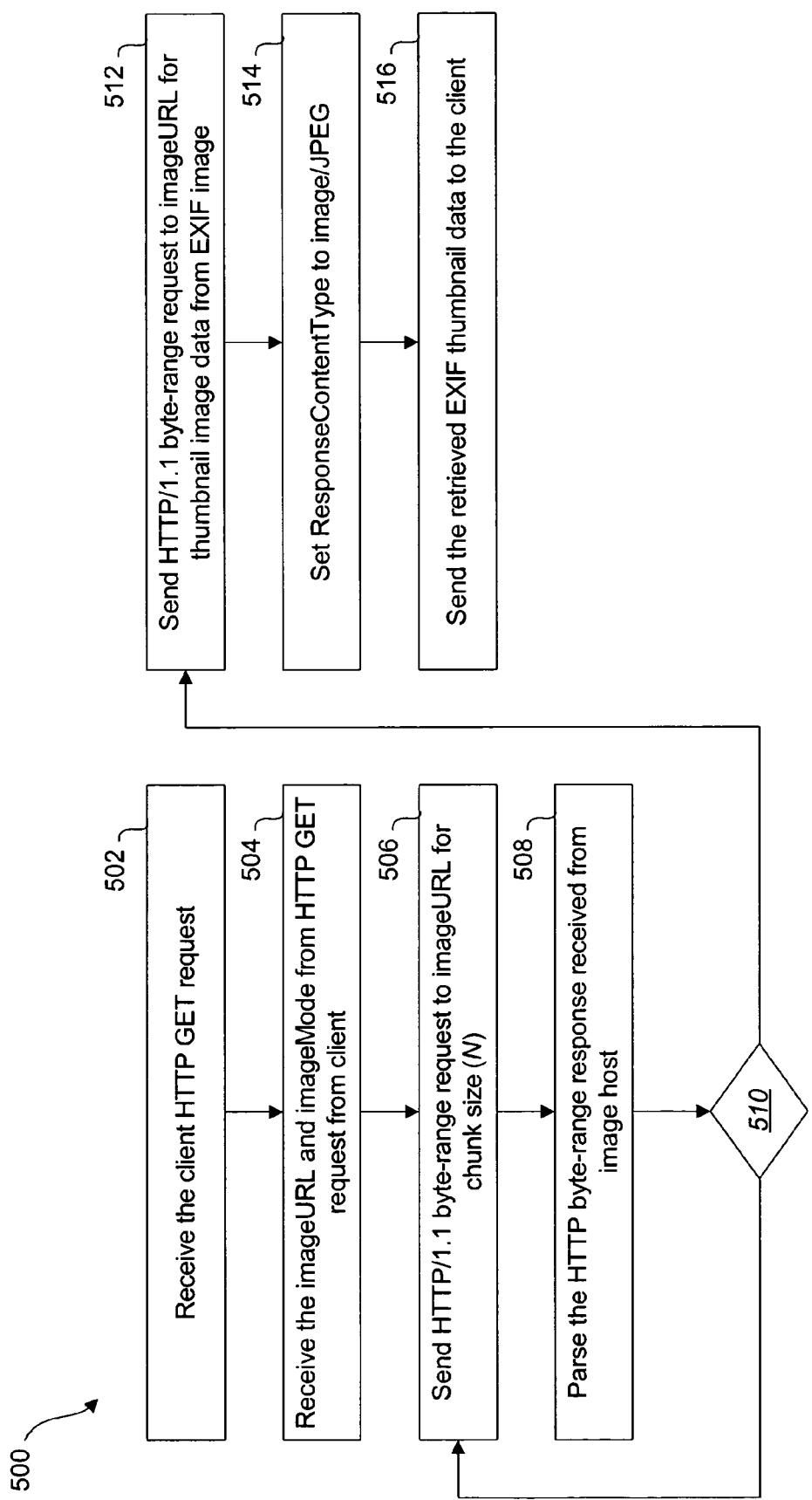
FIG. 5 is a flow diagram illustrating another embodiment of a method that may be performed by the thumbnail retrieval component.

FIG. 5 is a flow diagram illustrating another embodiment of a method 500 that may be performed by the thumbnail retrieval component 116. In the embodiment shown in FIG. 5, the image file 108 is in EXIF format, and communication between the client 102, server 104, and image host 106 occurs in accordance with HTTP version 1.1. The order of the steps or actions of the method 500 is for illustrative purposes only and may be changed in alternative embodiments.

The method 500 begins when a client HTTP GET request is received 502. The imageURL and imageMode are retrieved 504 from the HTTP GET request. An HTTP/1.1 byte-range request is sent 506 to the address corresponding to the imageURL. The byte-range in the request is set to a predetermined chunk size (N).

The HTTP byte-range response received from the image host 106 is parsed 508. It is then determined 510 whether the JpegIFOffset and JpegIFByteCount tags are included in the received response. If not, the method 500 returns to step 506 and proceeds as described above.

If the JpegIFOffset and JpegIFByteCount tags are included in the received response, an HTTP/1.1 byte-range request is sent 512 to the address corresponding to the imageURL for thumbnail image data from the EXIF image. The Response-ContentType is set 514 to image/JPEG. The retrieved EXIF thumbnail data is sent 516 to the client 102.

Figure 6:
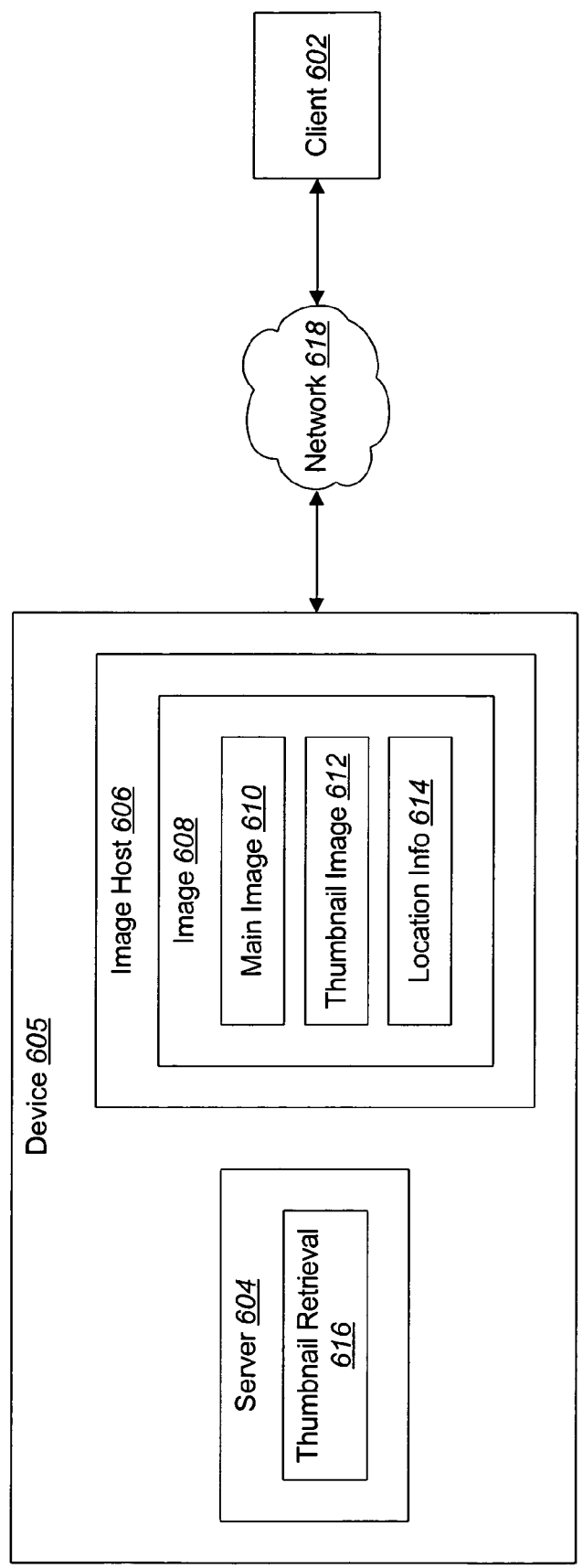
FIG. 6 is a block diagram illustrating an alternative system in which some embodiments may be practiced.

FIG. 6 is a block diagram illustrating an alternative system 600 in which some embodiments may be practiced. In the system 600 shown in FIG. 6, the server 604 and the image host 606 are located on the same device 605. The interactions between the client 602, the thumbnail retrieval component 616, and the server 604 may be as described above in connection with FIGS. 2-5.

Figure 7:
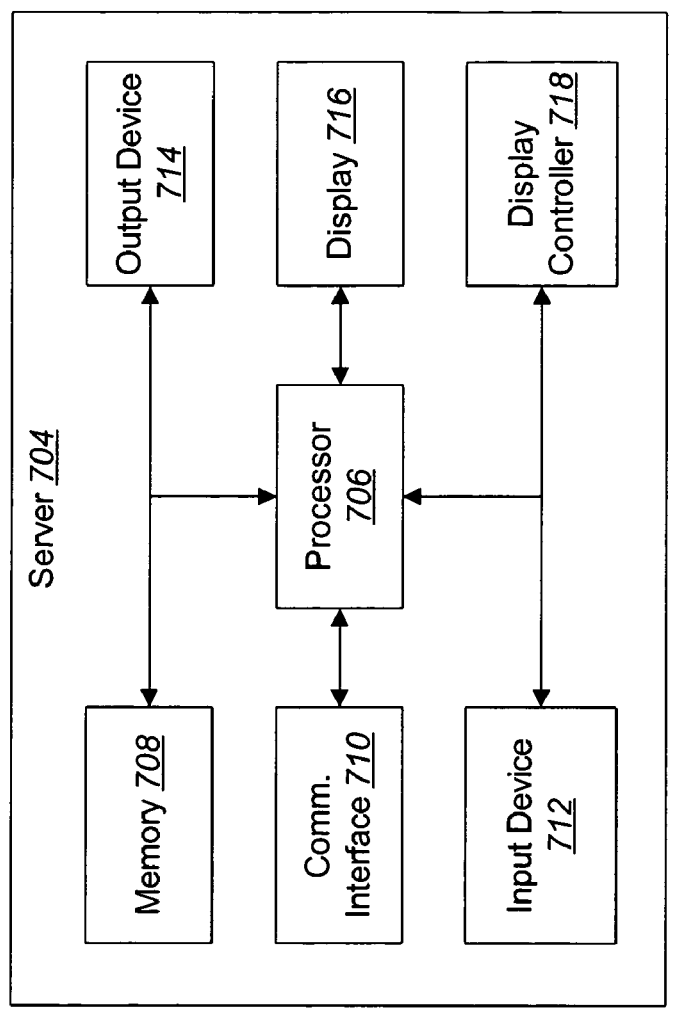
FIG. 7 is a block diagram illustrating the components typically utilized in a server used with embodiments herein.

FIG. 7 is a block diagram illustrating the components typically utilized in a server 704 used with embodiments herein. The illustrated components may be logical or physical and may be implemented using any suitable combination of hardware, software, and/or firmware. In addition, the different components may be located within the same physical structure or in separate housings or structures.

The server 704 includes a processor 706 and memory 708. The processor 706 controls the operation of the computer system and may be embodied as a microprocessor, a microcontroller, a digital signal processor (DSP) or other device known in the art. The processor 706 typically performs logical and arithmetic operations based on program instructions stored within the memory 708.

As used herein, the term "memory" 708 is broadly defined as any electronic component capable of storing electronic information, and may be embodied as read only memory (ROM), random access memory (RAM), magnetic disk storage media, optical storage media, flash memory devices in RAM, on-board memory included with the processor 706, EPROM memory, EEPROM memory, registers, etc. The memory 708 typically stores program instructions and other types of data. The program instructions may be executed by the processor 706 to implement some or all of the methods disclosed herein.

The server 704 typically also includes one or more communication interfaces 710 for communicating with other electronic devices. The communication interfaces 710 may be based on wired communication technology, wireless communication technology, or both. Examples of different types of communication interfaces 710 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The server 704 typically also includes one or more input devices 712 and one or more output devices 714. Examples of different kinds of input devices 712 include a keyboard, mouse, microphone, button, joystick, remote control device, trackball, touchpad, lightpen, etc. Examples of different kinds of output devices 714 include a speaker, printer, etc. One specific type of output device which is typically included in a computer system is a display device 716. Display devices 716 used with embodiments disclosed herein may utilize any suitable image projection technology, such as a cathode ray tube (CRT), liquid crystal display (LCD), light-emitting diode (LED), gas plasma, electroluminescence, or the like. A display controller 718 may also be provided, for converting data stored in the memory 708 into text, graphics, and/or moving images (as appropriate) shown on the display device 716.

Of course, FIG. 7 illustrates only one possible configuration of a server 704. Those skilled in the art will recognize that various other architectures and components may be utilized. In addition, various standard components are not illustrated in order to avoid obscuring aspects of the invention.

Figure 8:
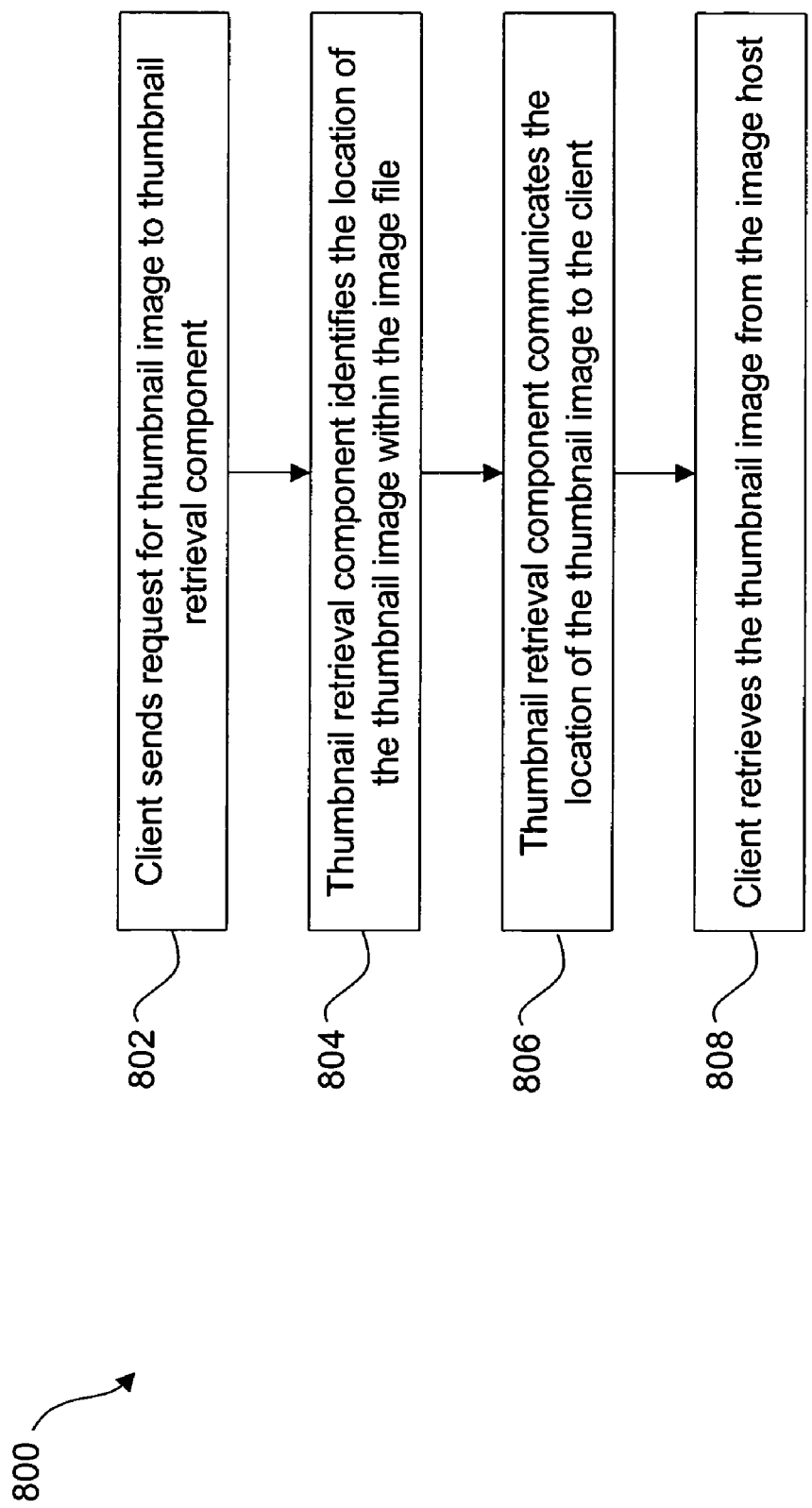
FIG. 8 is a flow diagram illustrating another exemplary method that may be performed by the different components in the system shown in FIG. 1 and/or the system shown in FIG. 6.

FIG. 8 is a flow diagram illustrating another exemplary method 800 that may be performed by the different components in the system 100 shown in FIG. 1 and/or the system 600 shown in FIG. 6. The order of the steps or actions of the method 800 is for illustrative purposes only and may be changed in alternative embodiments.

The method 800 begins when the client 102 sends 802 a request to the thumbnail retrieval component 116 for the location of a thumbnail image 112 within an image file 108. The request typically includes an address for the image file 108, such as a uniform resource locator (URL).

The thumbnail retrieval component 116 identifies 804 the location of the thumbnail image 112 within the image file 108. This step is typically accomplished by retrieving the location information 114 within the image file 108. As discussed above, the location information 114 may include the offset to the beginning of the thumbnail image 112 and the size of the thumbnail image 112. In some embodiments, this step may be accomplished in accordance with the method 300 described above in connection with FIG. 3. The thumbnail retrieval component 116 communicates 806 the location of the thumbnail image 112 to the client 102.

After receiving the location of the thumbnail image 112 from the thumbnail retrieval component 116, the client 102 retrieves 808 the thumbnail image 112 directly from the image host 106. In other words, the client 102 retrieves image file data from the image host 106 corresponding to the location received from the thumbnail retrieval component 116 in step 806. In some embodiments, this may be done in accordance with the HTTP protocol using a byte-range request. The thumbnail image data to be retrieved may be specified by a range header in the byte-range request.

In an alternate embodiment some or all of the thumbnail retrieval component (116 and/or 616) may be inside the client (102 and/or 602).

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. In a server, a method for fulfilling a request from a client for a thumbnail image, comprising:
    receiving the request from the client for the thumbnail image, wherein the thumbnail image is embedded in an image file along with a corresponding main image;
    retrieving the thumbnail image from an image host, wherein the entire image file is not retrieved from the image host; and
    sending the thumbnail image to the client.

2. The method of claim 1, wherein retrieving the thumbnail image comprises:
    identifying a location of the thumbnail image within the image file; and
    retrieving data from the image file corresponding to the location.

3. The method of claim 2, wherein identifying the location of the thumbnail image comprises:
    retrieving a first portion of the image file from the image host; and
    determining whether the first portion of the image file comprises thumbnail location information.

4. The method of claim 3, wherein the thumbnail location information comprises:
    an offset to the thumbnail image in the image file; and
    a size of the thumbnail image.

5. The method of claim 3, wherein identifying the location of the thumbnail image further comprises:
    retrieving a second portion of the image file from the image host if the first portion does not comprise the thumbnail location information; and
    determining whether the second portion of the image file comprises the thumbnail location information.

6. The method of claim 1, wherein the image file is in the exchangeable image file format (EXIF).

7. The method of claim 1, wherein the request is received from the client and the thumbnail image is sent to the client in accordance with hypertext transfer protocol (HTTP).

8. The method of claim 1, wherein the thumbnail image is retrieved from the image host in accordance with hypertext transfer protocol (HTTP).

9. The method of claim 1, wherein retrieving the thumbnail image from the image host comprises retrieving the bytes corresponding to the thumbnail image.

10. The method of claim 1, wherein the thumbnail image is retrieved from the image host in accordance with hypertext transfer protocol (HTTP), and wherein retrieving the bytes corresponding to the thumbnail image comprises using the byte-range feature of HTTP.

11. A server that is configured to fulfill a request from a client for a thumbnail image, the server comprising a thumbnail retrieval component that is configured to implement a method comprising:
    receiving the request from the client for the thumbnail image, wherein the thumbnail image is embedded in an image file along with a corresponding main image;
    retrieving the thumbnail image from an image host, wherein the entire image file is not retrieved from the image host; and
    sending the thumbnail image to the client.

12. The server of claim 11, wherein retrieving the thumbnail image comprises:
    identifying a location of the thumbnail image within the image file; and
    retrieving data from the image file corresponding to the location.

13. The server of claim 12, wherein identifying the location of the thumbnail image comprises:
    retrieving a first portion of the image file from the image host; and
    determining whether the first portion of the image file comprises thumbnail location information.

14. The server of claim 11, wherein the thumbnail retrieval component is selected from the group consisting of an Active Server Page, a Java Server Page, and a Common Gateway Interface script.

15. A non-transitory computer-readable medium comprising executable instructions for implementing a method in a server, wherein the instructions are executable to:
    receive a request from a client for a thumbnail image that is embedded within an image file along with a corresponding main image;
    retrieve the thumbnail image from an image host, wherein the entire image file is not retrieved from the image host; and
    send the thumbnail image to the client.

16. The non-transitory computer-readable medium of claim 15, wherein the instructions to retrieve the thumbnail image are executable to:
    identify a location of the thumbnail image within the image file; and
    retrieve data from the image file corresponding to the location.

17. The non-transitory computer-readable medium of claim 16, wherein the instructions to identify the location of the thumbnail image are executable to:
    retrieve a portion of the image file from the image host; and
    determine whether the portion of the image file comprises thumbnail location information.

18. In a server, a method for providing access to an embedded thumbnail image, comprising:
    receiving a request from a client for a location of a thumbnail image, wherein the thumbnail image is embedded in an image file along with a corresponding main image;
    retrieving thumbnail location information from an image host, wherein the entire image file is not retrieved from the image host; and
    sending the thumbnail location information to the client.

19. The method of claim 18, wherein retrieving the thumbnail location information comprises:
    retrieving a first portion of the image file from the image host; and
    determining whether the first portion of the image file comprises the thumbnail location information.

20. The method of claim 19, wherein the thumbnail location information comprises:
    an offset to the thumbnail image in the image file; and
    a size of the thumbnail image.

21. The method of claim 19, wherein the thumbnail location information comprises:
    a byte index for the starting and the ending byte for the thumbnail image.

22. The method of claim 19, wherein retrieving the thumbnail location information further comprises:
    retrieving a second portion of the image file from the image host if the first portion does not comprise the thumbnail location information; and
    determining whether the second portion of the image file comprises the thumbnail location information.

23. The method of claim 18, wherein the image file is in the exchangeable image file format (EXIF).

24. The method of claim 18, wherein the request is received from the client and the thumbnail location information is sent to the client in accordance with hypertext transfer protocol (HTTP).

25. The method of claim 18, wherein the thumbnail location information is retrieved from the image host in accordance with hypertext transfer protocol (HTTP).

26. In a client, a method for accessing an embedded thumbnail image, comprising:
    sending a request to a server for a location of a thumbnail image, wherein the thumbnail image is embedded in an image file along with a corresponding main image;
    receiving thumbnail location information from the server; and
    using the thumbnail location information to retrieve the thumbnail image from an image host, wherein the entire image file is not retrieved from the image host.

27. The method of claim 25, wherein the thumbnail location information comprises:
    an offset to the thumbnail image in the image file; and
    a size of the thumbnail image.

28. The method of claim 26, wherein the thumbnail location information comprises:
    a byte index for the starting and the ending byte for the thumbnail image.

29. The method of claim 25, wherein the image file is in the exchangeable image file format (EXIF).

30. The method of claim 25, wherein the request is sent to the server and the thumbnail location information is received from the server in accordance with hypertext transfer protocol (HTTP).

31. The method of claim 25, wherein retrieving the thumbnail image from the image host comprises retrieving the bytes corresponding to the thumbnail image.

32. The method of claim 29, wherein the thumbnail image is retrieved from the image host in accordance with hypertext transfer protocol (HTTP), and wherein retrieving the bytes corresponding to the thumbnail image comprises using the byte-range feature of HTTP.

33. In a server, a method for providing access to an embedded thumbnail image, comprising:
    publishing a reference to a thumbnail image that is embedded in an image file along with a corresponding main image;
    receiving a request from a client for the thumbnail image, wherein the request comprises the reference to the thumbnail image;
    retrieving the thumbnail image from an image host, wherein the entire image file is not retrieved from the image host; and
    sending the thumbnail image to the client.

34. In a server, a method for providing access to an embedded thumbnail image, comprising:
    publishing a reference to a thumbnail image that is embedded in an image file along with a corresponding main image;
    receiving a request from a client for a location of a thumbnail image, wherein the request comprises the reference to the thumbnail image;
    retrieving thumbnail location information from an image host, wherein the entire image file is not retrieved from the image host; and
    sending the thumbnail location information to the client.

\* \* \* \* \*

UNITED STATES PATENT AND TRADEMARK OFFICE
CERTIFICATE OF CORRECTION

| | |
|---|---|
| PATENT NO. | : 7,836,091 B2 |
| APPLICATION NO. | : 10/744220 |
| DATED | : November 16, 2010 |
| INVENTOR(S) | : Sachin G. Deshpande |

It is certified that error appears in the above-identified patent and that said Letters Patent is hereby corrected as shown below:

In column 5, line 63 please delete "fiber" and replace it with --fibre--.

Signed and Sealed this
Twelfth Day of April, 2011

David J. Kappos
*Director of the United States Patent and Trademark Office*